(12) United States Patent
Wang et al.

(10) Patent No.: US 10,666,962 B2
(45) Date of Patent: May 26, 2020

(54) TRAINING END-TO-END VIDEO PROCESSES

(71) Applicant: Magic Pony Technology Limited, London (GB)

(72) Inventors: Zehan Wang, London (GB); Robert David Bishop, London (GB); Ferenc Huszar, Cambridge (GB); Lucas Theis, London (GB)

(73) Assignee: Magic Pony Technology Limited, London (GB)

(*) Notice: Subject to any disclaimer, the term of this patent is extended or adjusted under 35 U.S.C. 154(b) by 4 days.

(21) Appl. No.: 15/707,294

(22) Filed: Sep. 18, 2017

(65) Prior Publication Data

US 2018/0131953 A1   May 10, 2018

Related U.S. Application Data

(63) Continuation of application No. PCT/GB2016/050922, filed on Mar. 31, 2016.

(30) Foreign Application Priority Data

Mar. 31, 2015 (GB) .................................... 1505544.5
Apr. 27, 2015 (GB) .................................... 1507141.8
(Continued)

(51) Int. Cl.
*H04N 19/46* (2014.01)
*G06T 9/00* (2006.01)
(Continued)

(52) U.S. Cl.
CPC ........... *H04N 19/46* (2014.11); *G06T 3/4046* (2013.01); *G06T 9/002* (2013.01); *H04N 19/154* (2014.11); *H04N 19/59* (2014.11); *H04N 19/85* (2014.11)

(58) Field of Classification Search
CPC combination set(s) only.
See application file for complete search history.

(56) References Cited

U.S. PATENT DOCUMENTS

| 5,638,125 A | 6/1997 | Ahn et al. |
| 5,673,213 A | 9/1997 | Weigl |

(Continued)

FOREIGN PATENT DOCUMENTS

| CN | 101621683 A | 1/2010 |
| CN | 102148996 A | 8/2011 |

(Continued)

OTHER PUBLICATIONS

Cayton, "Algorithms for manifold learning", Jun. 15, 2005, 17 pages.

(Continued)

*Primary Examiner* — Janese Duley
(74) *Attorney, Agent, or Firm* — Brake Hughes Bellermann LLP

(57) ABSTRACT

Disclosed is method for training a plurality of visual processing algorithms for processing visual data. The method includes using a pre-processing hierarchical algorithm to process the visual data prior to encoding the visual data in visual data processing, and using a post-processing hierarchical algorithm to further process the visual data following decoding visual data in visual data processing. The encoding and decoding are performed with respect to a predetermined visual data codec and may be content specific.

17 Claims, 2 Drawing Sheets

(30) Foreign Application Priority Data

| | | |
|---|---|---|
| May 21, 2015 | (GB) | 1508742.2 |
| Jun. 25, 2015 | (GB) | 1511231.1 |
| Nov. 3, 2015 | (GB) | 1519425.1 |
| Nov. 6, 2015 | (GB) | 1519687.6 |
| Feb. 19, 2016 | (WO) | PCT/GB2016/050423 |
| Feb. 19, 2016 | (WO) | PCT/GB2016/050424 |
| Feb. 19, 2016 | (WO) | PCT/GB2016/050425 |
| Feb. 19, 2016 | (WO) | PCT/GB2016/050426 |
| Feb. 19, 2016 | (WO) | PCT/GB2016/050427 |
| Feb. 19, 2016 | (WO) | PCT/GB2016/050428 |
| Feb. 19, 2016 | (WO) | PCT/GB2016/050429 |
| Feb. 19, 2016 | (WO) | PCT/GB2016/050430 |
| Feb. 19, 2016 | (WO) | PCT/GB2016/050431 |
| Feb. 19, 2016 | (WO) | PCT/GB2016/050432 |
| Feb. 23, 2016 | (GB) | 1603144.5 |
| Mar. 14, 2016 | (GB) | 1604345.7 |
| Mar. 18, 2016 | (GB) | 1604672.4 |

(51) Int. Cl.
*H04N 19/154* (2014.01)
*H04N 19/85* (2014.01)
*H04N 19/59* (2014.01)
*G06T 3/40* (2006.01)

(56) References Cited

U.S. PATENT DOCUMENTS

| | | | |
|---|---|---|---|
| 5,831,678 A | 11/1998 | Proctor | |
| 6,075,884 A | 6/2000 | Lubin et al. | |
| 6,470,097 B1 | 10/2002 | Lai et al. | |
| 6,735,336 B2 | 5/2004 | Avni et al. | |
| 7,133,568 B2 | 11/2006 | Nikitin et al. | |
| 7,477,800 B2 | 1/2009 | Avidan et al. | |
| 7,623,731 B2 | 11/2009 | Lim et al. | |
| 7,676,441 B2 * | 3/2010 | Matsugu | G06K 9/00604 706/20 |
| 8,037,010 B2 | 10/2011 | Jaros et al. | |
| 8,311,967 B1 | 11/2012 | Lin et al. | |
| 8,331,615 B2 | 12/2012 | Furukawa et al. | |
| 8,467,599 B2 | 6/2013 | El | |
| 8,731,255 B2 | 5/2014 | El-Baz | |
| 9,208,539 B2 | 12/2015 | Choudhury et al. | |
| 9,342,870 B2 | 5/2016 | Lin et al. | |
| 9,824,421 B2 | 11/2017 | Ragozin et al. | |
| 9,904,889 B2 | 2/2018 | Eliasmith et al. | |
| 9,906,787 B2 | 2/2018 | Amon et al. | |
| 10,019,642 B1 | 7/2018 | Navarrete Michelini et al. | |
| 10,181,092 B2 | 1/2019 | Shao et al. | |
| 2003/0071908 A1 | 4/2003 | Sannoh et al. | |
| 2004/0086039 A1 | 5/2004 | Reynolds et al. | |
| 2004/0136567 A1 | 7/2004 | Billinghurst et al. | |
| 2004/0150538 A1 | 8/2004 | Kim et al. | |
| 2004/0218834 A1 | 11/2004 | Bishop et al. | |
| 2005/0063461 A1 | 3/2005 | Lee et al. | |
| 2005/0200757 A1 | 9/2005 | Pica et al. | |
| 2007/0172452 A1 | 7/2007 | Klucher et al. | |
| 2007/0223887 A1 | 9/2007 | Kanamori et al. | |
| 2009/0034622 A1 | 2/2009 | Huchet et al. | |
| 2009/0067491 A1* | 3/2009 | Sun | H04N 19/132 375/240.03 |
| 2009/0110285 A1 | 4/2009 | Elad et al. | |
| 2009/0232213 A1 | 9/2009 | Jia | |
| 2010/0020874 A1 | 1/2010 | Shin et al. | |
| 2010/0150229 A1 | 6/2010 | Francois et al. | |
| 2010/0183217 A1 | 7/2010 | Seung et al. | |
| 2011/0299770 A1 | 12/2011 | Vaddadi et al. | |
| 2011/0304687 A1 | 12/2011 | Joshi et al. | |
| 2012/0288015 A1 | 11/2012 | Zhang et al. | |
| 2012/0294369 A1 | 11/2012 | Bhagavathy et al. | |
| 2013/0128111 A1 | 5/2013 | Corral-Soto | |
| 2013/0223734 A1 | 8/2013 | Tuzel et al. | |
| 2014/0177706 A1 | 6/2014 | Fernandes et al. | |
| 2014/0204996 A1 | 7/2014 | Spears et al. | |
| 2014/0301661 A1 | 10/2014 | Voronov et al. | |
| 2014/0369401 A1 | 12/2014 | Minoo et al. | |
| 2015/0015569 A1 | 1/2015 | Jung et al. | |
| 2015/0086109 A1 | 3/2015 | Paris et al. | |
| 2015/0181159 A1 | 6/2015 | Matsuyama | |
| 2016/0078600 A1 | 3/2016 | Perez Pellitero et al. | |
| 2016/0140408 A1 | 5/2016 | Shen et al. | |
| 2017/0132760 A1 | 5/2017 | Kothule et al. | |
| 2017/0193680 A1 | 7/2017 | Zhang et al. | |
| 2017/0345130 A1 | 11/2017 | Wang et al. | |
| 2017/0347060 A1 | 11/2017 | Wang et al. | |
| 2017/0347061 A1 | 11/2017 | Wang et al. | |
| 2017/0347110 A1 | 11/2017 | Wang et al. | |
| 2017/0374374 A1 | 12/2017 | Wang et al. | |
| 2018/0121769 A1 | 5/2018 | Huszar et al. | |
| 2018/0122048 A1 | 5/2018 | Wang et al. | |
| 2018/0129918 A1 | 5/2018 | Wang et al. | |
| 2018/0130177 A1 | 5/2018 | Wang et al. | |
| 2018/0130178 A1 | 5/2018 | Wang et al. | |
| 2018/0130179 A1 | 5/2018 | Wang et al. | |
| 2018/0130180 A1 | 5/2018 | Wang et al. | |
| 2018/0131953 A1 | 5/2018 | Wang et al. | |
| 2018/0139458 A1 | 5/2018 | Wang et al. | |
| 2018/0197089 A1 | 7/2018 | Krasser et al. | |
| 2018/0293713 A1 | 10/2018 | Vogels et al. | |

FOREIGN PATENT DOCUMENTS

| | | |
|---|---|---|
| EP | 0618737 A2 | 10/1994 |
| EP | 1720358 A2 | 11/2006 |
| EP | 2557789 A2 | 2/2013 |
| EP | 2806374 A1 | 11/2014 |
| JP | 1021385 A | 1/1998 |
| KR | 20030009575 A | 2/2003 |
| WO | 9739417 A2 | 10/1997 |
| WO | 0033207 A1 | 6/2000 |
| WO | 02/005208 A3 | 1/2002 |
| WO | 03094034 A1 | 11/2003 |
| WO | 2008133951 A2 | 11/2008 |
| WO | 2013143396 A1 | 10/2013 |
| WO | 2014052740 A1 | 4/2014 |
| WO | 2015193531 A1 | 12/2015 |
| WO | 2016132145 A1 | 8/2016 |
| WO | 2016132147 A1 | 8/2016 |
| WO | 2016132148 A1 | 8/2016 |

OTHER PUBLICATIONS

Chopra, et al., "Learning a similarity metric discriminatively, with application to face verification", In IEEE Conference on Computer Vision and Pattern Recognition (CVPR), 2005, pp. 539-549.

Dong, et al., "Compression Artifacts Reduction by a Deep Convolutional Network", IEEE International Conference on Computer Vision, Apr. 27, 2015, pp. 576-584.

Dong, et al., "Learning a Deep Convolutional Network for Image Super-Resolution", Lecture Notes in Computer Science, Sep. 6, 2014, pp. 184-199.

Search Report for GB Application No. 1502753.5, dated Jan. 12, 2016, 4 pages.

Search Report for GB Application No. 1503427.5, dated Dec. 17, 2015, 4 pages.

Search Report for GB Application No. 1505544.5, dated Feb. 12, 2016, 9 pages.

Search Report for GB Application No. 1507141.8, dated Dec. 21, 2015, 4 pages.

Search Report for GB Application No. 1508742.2, dated Jan. 25, 2016, 5 pages.

Search Report for GB Application No. 1511231.1, dated Jan. 11, 2016, 5 pages.

Search Report for GB Application No. 1519687.6, dated Apr. 13, 2016, 5 pages.

Examination Report for GB Application No. 1617471.6, dated May 3, 2017, 2 pages.

(56) References Cited

OTHER PUBLICATIONS

Examination Report for GB Application No. 1617471.6, dated Nov. 11, 2016, 6 pages.
Examination Report for GB Application No. 1617478.1, dated May 3, 2017, 4 pages.
Examination Report for GB Application No. 1617478.1, dated Nov. 18, 2016, 6 pages.
Kim, et al., "Example-based Learning for Single-Image Super-Resolution and JPEG Artifact Removal", Technical Report No. TR-173, retrieved on Jun. 1, 2016 from http://www.kyb.mpg.de/fileadmin/user_upload/files/publications/attachments/TechReport-173, Aug. 2008, 28 pages.
Liu, et al., "Nonparametric Scene Parsing: Label Transfer via Dense Scene Alignment", IEEE Conference on Computer Vision and Pattern Recognition, Jun. 2009, 8 pages.
Matikainen, et al., "Model Recommendation for Action Recognition", IEEE Conference on Computer Vision and Pattern Recognition, 2012, pp. 2256-2263.
Mittal, et al., "No-Reference Image Quality Assessment in the Spatial Domain", IEEE Transactions on Image Processing, vol. 21, Issue 12, Dec. 2012, pp. 4695-4708.
Pan, et al., "A Survey on Transfer Learning", IEEE Transactions on Knowledge and Data Engineering, vol. 22, No. 10, Oct. 2010, pp. 1345-1359.
International Search Report and Written Opinion for PCT Application No. PCT/GB2016/050423, dated May 11, 2016, 16 pages.
International Search Report and Written Opinion for PCT Application No. PCT/GB2016/050425, dated May 4, 2016, 18 pages.
International Search Report and Written Opinion for PCT Application No. PCT/GB2016/050426, dated May 13, 2016, 13 pages.
Torralba, et al., "80 million tiny images: a large dataset for non-parametric object and scene recognition", IEEE Transactions on Pattern Analysis and Machine Intelligence, vol. 30, Issue 11, Nov. 2008, pp. 1958-1970.
Wagstaff, et al., "Constrained K-means clustering with background knowledge", Proceedings of the Eighteenth International Conference on Machine Learning, 2001, pp. 577-584.
Yang, et al., "Coupled Dictionary Training for Image Super-Resolution", IEEE Transactions on Image Processing, vol. 21, Issue 8, Aug. 2012, 27 pages.
Yang, "Image super-resolution via sparse representation", IEEE Transactions on Image Processing, vol. 19, Issue 11, Nov. 2010, 51 pages.
Zeyde et al., "On Single Image Scale-Up Using Sparse-Representations", Curves and Surfaces, Springer, 2012, pp. 711-730.
"CS231n Convolutional Neural Networks for Visual Recognition", retrieved on Feb. 16, 2015, XP055488606, 2 pages.
International Search Report and Written Opinion for PCT Application No. PCT/GB2016/050427, dated May 4, 2016, 15 pages.
Examination Report for European Application No. 16706417.9, dated Jul. 10, 2018, 10 pages.
Examination Report for European Application No. 16706419.5, dated Jul. 10, 2018, 8 pages.
Examination Report for European Application No. 16706421.1, dated Jul. 10, 2018, 8 pages.
Examination Report for European Application No. 16706422.9, dated Jul. 10, 2018, 9 pages.
Examination Report for European Application No. 16706424.5, dated Jul. 10, 2018, 7 pages.
Examination Report for European Application No. 16715067.1, dated Jul. 18, 2018, 6 pages.
Long, et al., "Fully convolutional networks for semantic segmentation", IEEE Conference on Computer Vision and Pattern Recognition (CVPR), 2015, pp. 3431-3440.
Wang, et al., "Self-Tuned Deep Super Resolution", 2015 IEEE Conference on Computer Vision and Pattern Recognition Workshops, Jun. 7, 2015, XP032795527, 8 pages.

Zuo, et al., "Content-Adaptive Resolution Enhancement of Compressed Video with Encoder-Generated Side Information", International Conference on Consumer Electronics, Jan. 9, 2008, pp. 1-2.
Wikipedia, "Universal Approximation Theorem", retrieved from http://web.archive.org/web/20100701194338/https://en.wikipedia.org/wiki/Universal_approximation_theorem, Jun. 10, 2010, 2 pages.
Atreya, et al., "Novel Lossy Compression Algorithms With Stacked Autoencoders", retrieved from at http://cs229.stanford.edu/proj2009/AtreyaOshea.pdf, Dec. 11, 2009, 5 pages.
Bevilacqua , et al., "Video Super-Resolution Via Sparse Combinations of Key-Frame Patches in a Compression Context", 30th Picture Coding Symposium (PCS), Dec. 8, 2013, 5 pages.
Bishop, et al., "Super-Resolution Enhancement of Video", International Workshop on Artificial Intelligence and Statistics (AISTATS 2003), No. 9th, Jan. 2003, pp. 1-8.
Cheng, et al., "Fast Video Super-Resolution Using Artificial Neural Networks", 8th IEEE, IET International Symposium on Communication Systems, Networks and Digital Signal Processing, Jul. 18, 2012, 4 pages.
Dong, "Image Super-Resolution Using Deep Convolutional Networks", IEEE Transactions on Pattern Analysis and Machine Intelligence, vol. 38, No. 2, Feb. 1, 2016, 14 pages.
Gendy, et al., "A Fast Algorithm for Image Restoration Using a Recurrent Neural Network with Bound-Constrained Quadratic Optimization", The Seventh Australian and New Zealand Intelligent Information Systems Conference, Nov. 18, 2001, pp. 111-116.
Kwon, et al., "Adaptive Postprocessing Algorithm in Block-Coded Images Using Block Classification and MLP", IEEE Transactions on Fundamentals of Electronics, Communications and Computer Sciences, Engineering Sciences Society, vol. E86-A, No. 4, Apr. 1, 2003, pp. 961-967.
Liang, et al., "Incorporating Image Degeneration Modeling With Multitask Learning for Image Super-Resolution", IEEE International Conference on Image Processing, Sep. 27, 2015, pp. 2110-2114.
Liu, et al., "An Adaptive Image Denoising Model Based on Tikhonov and TV Regularizations", Advances in Multimedia, vol. 2014, Jan. 1, 2014, pp. 1-10.
Muneyasu, et al., "Image Restoration Using Layered Neural Networks and Hopfield Networks", Proceedings of the International Conference on Image Processing, vol. 2, Oct. 23, 1995, pp. 33-36.
Nielsen, "A Visual Proof That Neural Nets Can Compute Any Function", Neural Networks and Deep Learning, Chapter 4, XP055562061, Feb. 6, 2015, 32 pages.
Park, et al., "Super-Resolution Image Reconstruction: A Technical Overview", IEEE Signal Processing Magazine, vol. 20, No. 3, May 1, 2003, pp. 21-36.
Qu, et al., "Single Image Super-Resolution via Convolutional Neural Network and Total Variation Regularization", MultiMedia Modeling. Lecture Notes in Computer Science, vol. 951, Jan. 1, 2016, pp. 28-38.
Reed, et al., "Generative Adversarial Text to Image Synthesis", Proceedings of the 33rd International Conference on Machine Learning, JMLR: W&CP vol. 48, May 2016, 9 pages.
Rudin, et al., "Non-Linear Total Variation Based Noise Removal Algorithms", Physica D, vol. 60, No. 1-4, Nov. 1, 1992, pp. 259-268.
Sheikh, et al., "An Information Fidelity Criterion for Image Quality Assessment Using Natural Scene Statistics", IEEE Transactions on Image Processing, vol. 14, No. 12, Dec. 1, 2005, pp. 2117-2128.
Shi, et al., "Is the Deconvolution Layer the Same As a Convolutional Layer?", retrieved on Mar. 11, 2019 from https://arxiv.org/ftp/arxiv/papers/1609/1609.07009.pdf, Sep. 22, 2016, 7 pages.
Sumali, et al., "Single Image Super Resolution by No-Reference Image Quality Index Optimization in PCA Subspace", IEEE 12th International Colloquium on Signal Processing and Its Applications, Mar. 4, 2016, pp. 183-187.
Wang, et al., "Deep Networks for Image Super-Resolution with Sparse Prior", International Conference on Computer Vision (ICCV), Dec. 1, 2015, 9 pages.
Xie et al., "Image Denoising and Inpainting With Deep Neural Networks", Advances in neural information processing systems, 2012, 9 pages.

(56) References Cited

OTHER PUBLICATIONS

Yang, et al., "Single-Image Super-Resolution Reconstruction via Learned Geometric Dictionaries and Clustered Sparse Coding", IEE Transactions on Image Processing, vol. 21, No. 9, Sep. 1, 2012, pp. 4016-4028.

Yu, et al., "VLSI Friendly Fast CU/PU Mode Decision for HEVC Intra Encoding: Leveraging Convolution Neural Network", 2015 IEEE International Conference on Image Processing, Sep. 27, 2015, pp. 1285-1289.

* cited by examiner

TRAINING END-TO-END VIDEO PROCESSES

CROSS REFERENCE TO RELATED APPLICATIONS

This is a continuation of, and claims priority to, International Patent Application No. PCT/GB2016/050922, filed Mar. 31, 2016, which in turn claims priority to the following United Kingdom applications:
  GB 1519425.1, filed Nov. 3, 2015;
  GB 1519687.6, filed Nov. 6, 2015;
  GB 1508742.2, filed May 21, 2015;
  GB 1511231.1, filed Jun. 25, 2015;
  GB 1507141.8, filed Apr. 27, 2015;
  GB 1505544.5, filed Mar. 31, 2015;
  GB 1603144.5, filed Feb. 23, 2016;
  GB 1604345.7, filed Mar. 14, 2016; and
  GB 1604672.4, filed Mar. 14, 2016, and claims priority to the following International applications:
  PCT/GB2016/050423, filed Feb. 19, 2016;
  PCT/GB2016/050424, filed Feb. 19, 2016;
  PCT/GB2016/050425, filed Feb. 19, 2016;
  PCT/GB2016/050426, filed Feb. 19, 2016;
  PCT/GB2016/050427, filed Feb. 19, 2016;
  PCT/GB2016/050428, filed Feb. 19, 2016;
  PCT/GB2016/050429, filed Feb. 19, 2016;
  PCT/GB2016/050430, filed Feb. 19, 2016;
  PCT/GB2016/050431, filed Feb. 19, 2016; and
  PCT/GB2016/050432, filed Feb. 19, 2016,
all of which are incorporated herein by reference.

FIELD

Example embodiments relate to a method for processing visual data. Specifically, the methods and systems preserve visual information, and optimize efficiency during compression and decompression.

BACKGROUND

Increase in Quality of Video and Display Technology

Developments in display technology have led to significant improvements in the resolution of images and video displayed on display hardware, such as televisions, on computer monitors, and using video projectors. For example, television screens that are able to display High Definition or HD resolution content (typically having a resolution of 1920×1080 pixels) have been broadly adopted by consumers. More recently, television screens able to display Ultra High Definition or Ultra HD resolution content (typically having a resolution over 3840×2160 pixels) are starting to become more widespread.

In contrast, HD resolution video content is only now becoming commonplace and most legacy content is only available at either Digital Versatile Disc Video or DVD-Video resolution (typically having a resolution of 720×586 pixels or 720×480 pixels) or Standard Definition or SD Resolution (where the video content only has a resolution of 640×480 pixels). Some broadcast channels are limited to SD resolutions. Video-streaming services can be restricted to operating at DVD-Video or SD resolutions, to reduce transmission problems where consumers have limitations on available transmission bandwidth or because of a lack of legacy content at higher resolutions.

As a result, there can be a lack of sufficiently high-resolution video content for display on HD and Ultra HD television screens, for both current video content as well as for legacy video content and video streaming services. Also, over time mobile devices such as mobile phones and tablet computers with increasingly larger and higher-resolution screens are being produced and adopted by users. Further, current video content, being output at HD resolutions, is already at a significantly lower resolution than can be displayed by the latest consumer displays operating at, for example, Ultra HD resolutions. To provide sufficiently immersive virtual reality or VR experiences, display technology needs to be sufficiently high resolution even for smaller screen sizes.

The user experience of having to display content that has significantly lower resolution than the user's default screen/display resolution is not optimal.

Growth in Data Transmission and Network Limitations

The amount of visual data being communicated over data networks such as the Internet has grown dramatically over time and there is increasing consumer demand for high-resolution, high quality, high fidelity visual data content, such as video streaming including, for example, video at HD and Ultra HD resolution. As a result, there are substantial challenges in meeting this growing consumer demand and high performance video compression is required to enable efficient use of existing network infrastructure and capacity.

Video data already makes up a significant fraction of all data traffic communicated over the Internet, and mobile video (i.e. video transmitted to and from mobile devices over wireless data networks such as UTMS/CDMA) is predicted to increase, accounting for 72 percent of total mobile data traffic by the end of that forecast period. As a result, there are substantial challenges in meeting this growing consumer demand and more efficient visual data transmission is required to enable efficient use of existing network infrastructure and capacity.

Streaming video to consumers using available streaming data bandwidth, media content providers can down-sample or transcode the video content for transmission over a network at one or a variety of bitrates so that the resolution of the video can be appropriate for the bitrate available over each connection or to each device and correspondingly the amount of data transferred over the network can be better matched to the available reliable data rates. For example, a significant proportion of current consumer Internet connections are not able to reliably support continuous streaming of video at an Ultra HD resolution, so video needs to be streamed at a lower quality or lower resolution to avoid buffering delays.

Further, where a consumer wishes to broadcast or transmit video content, the uplink speeds of consumer Internet connections are typically a fraction of the download speeds and thus only lower quality or lower resolution video can typically be transmitted. In addition, the data transfer speeds of typical consumer wireless networks are another potential bottleneck when streaming video data for video at resolutions higher than HD resolutions or virtual reality data and content to/from contemporary virtual reality devices. A problem with reducing the resolution of a video when transmitting it over a network is that the reduced resolution video may not be at the desired playback resolution, but in some cases there is either not sufficient bandwidth or the bandwidth available is not reliable during peak times for transmission of a video at a high resolution.

Alternatively, even without reducing the original video resolution, the original video may have a lower resolution than desired for playback and so may appear at a suboptimal quality when displayed on higher-resolution screens.

Video Compression Techniques

Existing commonly used video compression techniques, such as H.264 and VP8, as well as proposed techniques, such as H.265, HEVC and VP9, all generally use similar approaches and families of compression techniques. These compression techniques make a trade-off between the quality and the bit-rate of video data streams when providing inter-frame and intra-frame compression, but the amount of compression possible is largely dependent on the image resolution of each frame and the complexity of the image sequences.

To illustrate the relationship between bitrate and resolution among other factors, it is possible to use an empirically-derived formula to show how the bitrate of a video encoded with, for example the H.264 compression technique, relates to the resolution of that video:

$$\text{bitrate} \propto Q \times w \times h \times f \times m$$

where Q is the quality constant, w is the width of a video, h is the height of a video, f is the frame-rate of a video and m is the motion rank, where m∈{1, . . . ,4} and a higher m is used for fast-changing hard-to-predict content.

The above formula illustrates the direct relationship between the bitrate and the quality constant Q. A typical value, for example, that could be selected for Q would be 0.07 based on published empirical data, but a significant amount of research is directed to optimising a value for Q.

The above formula also illustrates the direct relationship between the bitrate and the complexity of the image sequences, i.e. variable m. The aforementioned existing video codecs focus on spatial and temporal compression techniques. The newer proposed video compression techniques, such as H.265, HEVC and VP9, seek to improve upon the motion prediction and intra-frame compression of previous techniques, i.e. optimising a value for m.

The above formula further illustrates a direct relationship between the bitrate, the resolution of the video, i.e. variables w and h. In order to reduce the resolution of video, several techniques exist to downscale the resolution of video data to reduce the bitrate.

As a result of the disadvantages of current compression approaches, existing network infrastructure and video streaming mechanisms are becoming increasingly inadequate to deliver large volumes of high quality video content to meet ever-growing consumer demands for this type of content. This can be of particular relevance in certain circumstances, for example in relation to live broadcasts, where bandwidth is often limited, and extensive processing and video compression cannot take place at the location of the live broadcast without a significant delay due to inadequate computing resources being available at the location.

Machine Learning Techniques

Machine learning is the field of study where a computer or computers learn to perform classes of tasks using the feedback generated from the experience or data gathered that the machine learning process acquires during computer performance of those tasks.

Typically, machine learning can be broadly classed as supervised and unsupervised approaches, although there are particular approaches such as reinforcement learning and semi-supervised learning which have special rules, techniques and/or approaches.

Supervised machine learning is concerned with a computer learning one or more rules or functions to map between example inputs and desired outputs as predetermined by an operator or programmer, usually where a data set containing the inputs is labelled.

Unsupervised learning is concerned with determining a structure for input data, for example when performing pattern recognition, and typically uses unlabelled data sets.

Reinforcement learning is concerned with enabling a computer or computers to interact with a dynamic environment, for example when playing a game or driving a vehicle.

Various hybrids of these categories are possible, such as semi-supervised machine learning where a training data set has only been partially labelled.

For unsupervised machine learning, there is a range of possible applications such as, for example, the application of computer vision techniques to image processing or video enhancement. Unsupervised machine learning is typically applied to solve problems where an unknown data structure might be present in the data. As the data is unlabelled, the machine learning process is required to operate to identify implicit relationships between the data for example by deriving a clustering metric based on internally derived information. For example, an unsupervised learning technique can be used to reduce the dimensionality of a data set and attempt to identify and model relationships between clusters in the data set, and can for example generate measures of cluster membership or identify hubs or nodes in or between clusters, for example, using a technique referred to as weighted correlation network analysis, which can be applied to high-dimensional data sets, or using k-means clustering to cluster data by a measure of the Euclidean distance between each datum.

Semi-supervised learning is typically applied to solve problems where there is a partially labelled data set, for example where only a subset of the data is labelled. Semi-supervised machine learning makes use of externally provided labels and objective functions as well as any implicit data relationships.

When initially configuring a machine learning system, particularly when using a supervised machine learning approach, the machine learning algorithm can be provided with some training data or a set of training examples, in which each example is typically a pair of an input signal/vector and a desired output value, label (or classification) or signal. The machine learning algorithm analyses the training data and produces a generalised function that can be used with unseen data sets to produce desired output values or signals for the unseen input vectors/signals. The user needs to decide what type of data is to be used as the training data, and to prepare a representative real-world set of data. The user should take care to ensure that the training data contains enough information to accurately predict desired output values without providing too many features (which can result in too many dimensions being considered by the machine learning process during training, and could also mean that the machine learning process does not converge to good solutions for all or specific examples). The user should determine the desired structure of the learned or generalised function, for example whether to use support vector machines or decision trees.

The use of unsupervised or semi-supervised machine learning approaches are sometimes used when labelled data is not readily available, or where the system generates new labelled data from unknown data given some initial seed labels.

Current training approaches for most machine learning algorithms can take significant periods of time, which delays the utility of machine learning approaches and also prevents the use of machine learning techniques in a wider field of potential application.

Machine Learning & Image Super Resolution

To improve the effectiveness of some super resolution techniques, it is possible to incorporate machine learning, otherwise termed a "learned approach", into the image super resolution techniques described above.

For example, one machine learning approach that can be used for image enhancement, using dictionary representations for images, is a technique generally referred to as dictionary learning. This approach has shown effectiveness in low-level vision tasks like image restoration.

SUMMARY

Aspects and/or embodiments are set out in the appended claims. These and other aspects and embodiments are also described herein.

Certain aspects and/or embodiments seek to provide techniques for generating algorithms that can be used to enhance visual data based on received input visual data and a plurality of pieces of training data.

Other aspects and/or embodiments seek to provide techniques for machine learning.

According to a first aspect there is provided a method for training a plurality of visual processing algorithms for processing visual data, the method comprising the steps of: using a pre-processing hierarchical algorithm to process visual data prior to encoding the visual data in visual data processing; and using a post-processing hierarchical algorithm to reconstruct visual data following decoding visual data in visual data processing wherein the steps of encoding and decoding are performed with respect to a predetermined visual data codec.

The training of the algorithms enables a more efficient encoding of the visual data to be transmitted, maintain the quality of the visual data and also ensuring a suitable size for transmission over a network by producing a bit-stream which is of lower quality than the input visual data.

Optionally, in some embodiments, the method may further include the step of receiving one or more sections of visual data.

Receiving the visual data enables sections of the visual data to be stored remoted, for example on the Internet. Alternatively, the visual data may be stored locally on a device configured to perform the method.

Optionally, processing the visual data includes optimising the visual data.

In some embodiments, the processing of the visual data may also be used to optimise the visual data such as reduce the size and/or enhance the quality. For example, in some embodiments this may include increasing the resolution whilst maintaining a suitable size for transmission.

Optionally, one or more parameters associated with the pre-processing hierarchical algorithm may be stored in a library for re-use in encoding alternative visual data similar to the visual data used for training, or may be transmitted to a device configured to process alternative visual data similar to the visual data used for training. Similarly, one or more parameters associated with the post-processing hierarchical algorithm, may be transmitted with any process visual data to a remote device.

The storing of parameters associated with the trained hierarchical algorithms used to pre- and post-process the visual data enables similar training techniques to be used on similar visual data. Furthermore, it allows any parameters to be transmitted with the visual data to a remote device for displaying, removing the need to re-train the hierarchical algorithms on said remote device.

Optionally, the pre-processing and/or post-processing hierarchical algorithm may include a layer that generalises the visual data processing, and may further include a layer that generalises the encoding and/or decoding performed during visual data processing.

The generalisation of the visual data processing and the encoding or decoding indicates the algorithm may analyse training data and produce a generalised function that may be used with unseen data sets to produce desired output values or signals for the unseen input vectors/signals. The user needs to decide what type of data is to be used as the training data, and ensure there is enough training data to optimise the learning of the function, or to ensure the function is able to predict an optimal output. Furthermore, the should take care to ensure that the training data contains enough information to accurately predict desired output values without providing too many features (which can result in too many dimensions being considered by the machine learning process during training, and could also mean that the machine learning process does not converge to good solutions for all or specific examples). In some embodiments, instead of restricting the amount of information in the training data, regularisation or Bayesian methods may be used. The user should determine the desired structure of the learned or generalised function, for example whether to use support vector machines or decision trees.

Optionally, the method may further include receiving a plurality of criteria upon which to base any processing. In some embodiments, the criteria may be a specific bit rate or a quality characteristic.

The use of criteria enables the method to optimise and train any algorithms based on specific hardware, software, content type, or user requirements. In some embodiments, the specification of a bit-rate indicates the method is to optimise the algorithms such that the best quality visual data is produced for a specific bandwidth. Alternatively, some form of quality criteria, such as resolution, peak signal-to-noise ratio (PSNR), or mean squared error (MSE) or a perceptual or subjective metric, may be provided which would enable the method to optimise the algorithms so that the best compression is achieved whilst maintaining the specified quality.

Optionally, the hierarchical algorithms include a plurality of connected layers, and the connected layers may be sequential, recurrent, recursive, branching or merging.

Optionally, the visual data includes one or more sections of visual data, and at least one section lower-quality visual data may include any of: a single frame of lower-quality visual data, a sequence of frames of lower-quality visual data, and a region within a frame or sequence of frames of lower-quality visual data. Furthermore, the lower-quality visual data may include a plurality of frames of video. In some embodiments, the visual data may include a plurality of frames of video, or a plurality of images.

Depending on the visual data being processed, in some embodiments models can be selected for sections of visual data comprising a sequence of frames or a region within a frame or sequence of frames. In these embodiments each could be necessary in order to provide the most efficient method of processing the original visual data.

Optionally, the hierarchical algorithm differs for each section of visual data.

In some embodiments, the use of different hierarchical algorithms for each section of visual data enables the most efficient hierarchical algorithm to be used for a particular section as opposed to using a single hierarchical algorithm for the entire visual data.

Optionally, the hierarchical algorithm is selected from a library of algorithms.

In some embodiments, a stored library of algorithms allows selection of a hierarchical algorithm for comparison without having to develop them or obtain them from an external source. In some embodiments, the comparison can be between a plurality of algorithms in the library. Use of such a library, in at least some embodiments, may result in the faster selection of a suitable hierarchical algorithm for enhancing the visual data or, in some embodiments, the most suitable hierarchical algorithm in a library (for example, by basing a measure of suitability on a predetermined metric).

Optionally, the standardised features of the at least one section of received lower-quality visual data are extracted and used to select the hierarchical algorithm from the library of algorithms.

In some embodiments, extracted standardised features are used to produce a value or series of values based on a metric from the input data. In these embodiments, the metric can then be used to select the pre-trained model from the library which is most appropriate for the input data, as each model in the library has associated metric values based on the input data from which the models were respectively trained, the selection based on the similarity between the metrics associated with the input data and each of the pre-trained models.

Optionally, the hierarchical algorithm to be selected from the library of algorithms is based on generating the highest quality version of the lower-quality visual data, preferably wherein quality can be defined by any of: an error rate; a bit error rate; a peak signal-to-noise ratio (PSNR); or a structural similarity index.

The predetermined metrics used in some embodiments to determine the hierarchical algorithm to be selected can be based on a predicted quality of the output data for each pre-trained model. In some of these embodiments, quality can be defined by any or all of: an error rate; a peak signal-to-noise ratio; or a structural similarity index.

Optionally, the hierarchical algorithms are developed using a learned approach.

In some embodiments, hierarchical or non-hierarchical algorithms can be substantially accurate and therefore enable a more accurate reconstruction, for example produce higher quality visual data from the low-quality visual data that is transmitted, for example where quality can be measured by resolution, PSNR, MSE, or a perceptual measure or metric determining that the quality is sufficiently aesthetically pleasing or by a low reproduction error rate in comparison to the original high-quality visual data. In another example, the hierarchical or non-hierarchical algorithms can produce higher quality versions of visual data using the fidelity data. In some optional embodiments, a down-sampled version of the resulting visual data comes out to be the same or similar as a down-sampled version of the original visual data. In some embodiments, using a learned approach can substantially tailor the hierarchical model or models for each portion of visual data.

Optionally, the learned approach includes machine learning techniques. The hierarchical algorithm may also be a non-linear hierarchical algorithm which may include one or more convolutional neural networks.

In some embodiments, through using a learning-based approach, i.e. an approach that does not rely on pre-defined visual data features and operators, the model(s) can be optimised for each section or sequence of sections.

In some embodiments, the training of neural networks can be more computationally complex than dictionary learning for a similar accuracy, but the resulting model or algorithm can also be more flexible in representing visual data while using fewer coefficients for the reconstruction. In some embodiments, the resultant neural network model to be transmitted alongside the lower-quality visual data can be both smaller and can be more accurate in the reconstruction of the higher-quality visual data.

Some aspects can provide an improved technique for generating reconstruction parameters that can be used, when converting original high-quality visual data into a down-sampled low-quality visual data, to allow recreation of higher quality visual data without significant loss in quality, for example having a low reconstruction error in comparison with the original visual data, and with a reduction in visual data transferred over a network. In such aspects, the application of such a technique can reduce the data transmitted when transmitting visual data in comparison with existing techniques while enabling reproduction of the visual data at its original quality without significant loss in quality in comparison to the original visual data (where quality can be defined by objective metrics such as error rate, PSNR and SSIM as well as subjective measures) or, alternatively, based on a perception measure or metric rather than on a pixel-wise comparison of images. In such aspects, such a proposed technique can allow minimal changes to be made to the overall infrastructure of service providers, as it can augment most existing compression techniques, and can provide advantages in encoding and streaming applications.

Optionally, the hierarchical algorithm can be used as a filter in the encoding or decoding of visual data.

In some embodiments, using the method as a filter for visual data codecs can provide very high computational efficiency, and therefore can also provide minimal energy costs in performing such filtering. In these or other embodiments, the method can provide a filter that is fast and/or flexible in expression and that can perform substantially accurate filtering in at least some embodiments.

Optionally, the higher-quality visual data is at a higher resolution than the lower-quality visual data, wherein the lower-quality visual data may contain a higher amount of artefacts than the higher-quality visual data.

In some embodiments, separating the visual data into a series of sections allows for the individual sections to be down-sampled thus reducing the visual data size, thereby allowing for lower quality sections to be transmitted as re-encoded visual data in the original or optionally a more optimal codec but at a lower resolution.

Optionally, the hierarchical algorithm performs image enhancement, preferably using super-resolution techniques. The hierarchical algorithm may also use a spatio-temporal approach.

In some embodiments, optionally for use for a section of visual data, the example based model may be a neural network and can use spatio-temporal convolution. In some embodiments, separating visual data into a series of sections allows for the individual sections to be down-sampled thus reducing the visual data size, thereby allowing for lower quality sections to be transmitted as re-encoded visual data in the original or optionally a more optimal codec but at a lower quality. In some embodiments, a spatio-temporal network can allow an improvement in performance by exploiting the temporal information in the visual data and, for example, within a similar scene in sequential sections of visual data, there may be stationary sections of background in the sequential sections providing information relevant for the higher-quality version of that scene such that temporally consecutive sections can be used to super resolve one section.

Optionally, enhancing the quality of visual data includes upscaling the quality of the visual data. Furthermore, the plurality of input sections may include at least one low-quality input or a plurality of low-quality inputs, wherein quality can be measured subjectively.

Optionally, using the pre-processing or post-processing hierarchical algorithms may include any of: training the hierarchical algorithms; generating the hierarchical algorithms; or developing the hierarchical algorithms or applying the trained algorithm.

Aspects and/or embodiments include a computer program product comprising software code to effect the method and/or apparatus of other aspects and/or embodiments herein described.

It should be noted that in some aspects and/or embodiments, the terms model and/or algorithm and/or representation and/or parameters and/or functions can be used interchangeably.

It should also be noted that visual data, in some embodiments, may include image and/or video data.

References to visual data can be references to video data and/or image data in some aspects and/or embodiments and vice versa. References to low-quality and/or lower-quality can be references to low-resolution and/or lower-resolution in some aspects and/or embodiments and vice versa. References to high-quality and/or higher-quality and/or highest quality and/or original quality can be references to high-resolution and/or higher-resolution and/or highest-resolution and/or original resolution and/or increased fidelity in some aspects and/or embodiments and vice versa. References to sections can be references to frames and/or portions of frames in some aspects and/or embodiments and vice versa. References to enhance or enhancement can be references to upscale and/or upscaling in some aspects and/or embodiments and vice versa

BRIEF DESCRIPTION OF FIGURES

Embodiments will be described, by way of example only with reference to the accompanying drawing, in which.

SPECIFIC DESCRIPTION

Figure 1B:
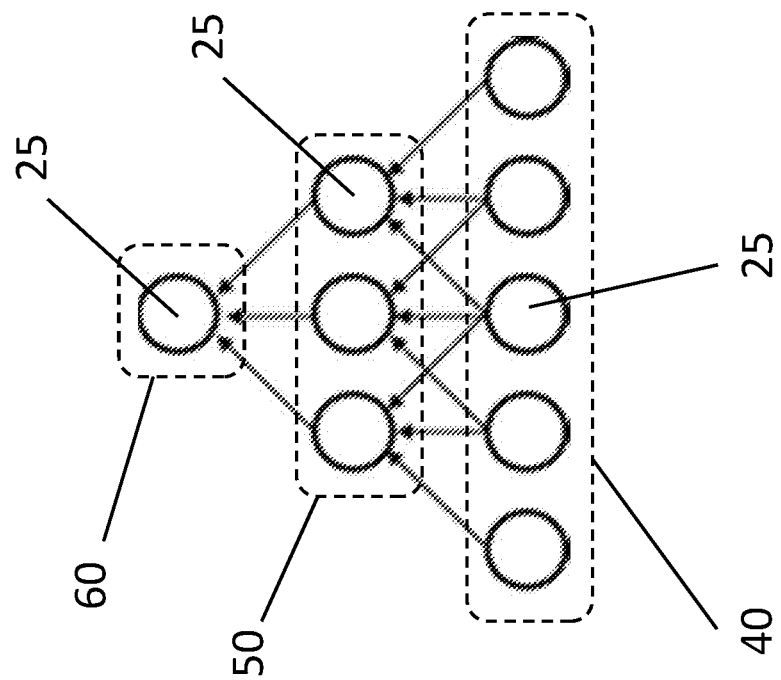
FIG. 1b illustrates the layers in a convolutional neural network with sparsity constraints.
Figure 1A:
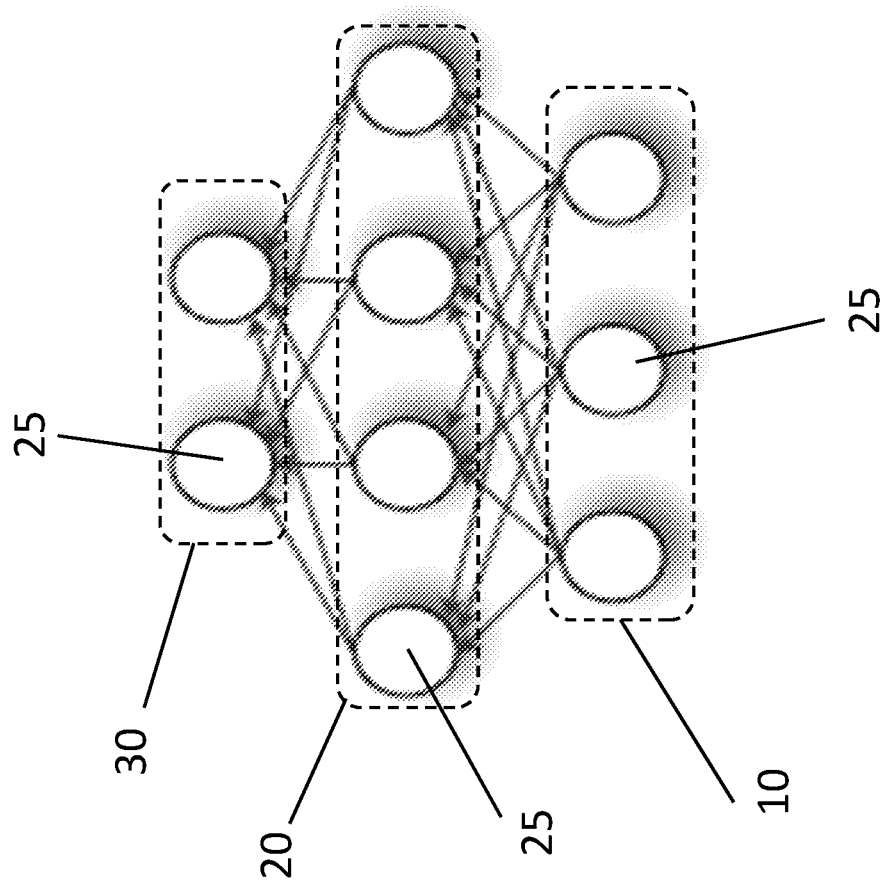
FIG. 1a illustrates the layers in a convolutional neural network with no sparsity constraints.

With reference to FIGS. 1a and 1b, various possible configurations of neural network for use in at least some embodiments shall now be described in detail.

An example layered neural network is shown in FIG. 1a having three layers 10, 20, 30, each layer 10, 20, 30 formed of a plurality of neurons 25, but where no sparsity constraints have been applied so all neurons 25 in each layer 10, 20, 30 are networked to all neurons 25 in any neighbouring layers 10, 20, 30. The example simple neural network shown in FIG. 2a is not computationally complex due to the small number of neurons 25 and layers. Due to the density of connections, however, the arrangement of the neural network shown in FIG. 1a may not scale up easily to larger sizes of network, i.e. the connections between neurons/layers, easily as the computational complexity soon becomes too great as the size of the network increases which in some embodiments may be in a non-linear fashion.

Where neural networks need to be scaled up to work on inputs with a high number of dimensions, it can therefore become too computationally complex for all neurons 25 in each layer 10, 20, 30 to be networked to all neurons 25 in the one or more neighbouring layers 10, 20, 30. A predetermined initial sparsity condition is used to lower the computational complexity of the neural network, by limiting the number of connections between neurons and/or layers thus enabling a neural network approach to work with high dimensional data such as images.

An example of a neural network is shown in FIG. 1b with sparsity constraints, according to at least one embodiment. The neural network shown in FIG. 1b is arranged so that each neuron 25 is connected only to a small number of neurons 25 in the neighbouring layers 40, 50, 60 thus creating a neural network that is not fully connected and which can scale to function with, higher dimensional data— for example as an optimisation process for video. The smaller number of connections in comparison with a fully networked neural network allows for the number of connections between neurons to scale in a substantially linear fashion.

Alternatively, in some embodiments neural networks can be used that are fully connected or not fully connected but in different specific configurations to that described in relation to FIG. 1b.

Further, in some embodiments, convolutional neural networks are used, which are neural networks that are not fully connected and therefore have less complexity than fully connected neural networks. Convolutional neural networks can also make use of pooling, for example max-pooling or mean-pooling, to reduce the dimensionality (and hence complexity) of the data that flows through the neural network and thus this can reduce the level of computation required. In some embodiments, various approaches to reduce the computational complexity of convolutional neural networks can be used such as the Winograd algorithm or low-rank matrix approximations.

Figure 2:
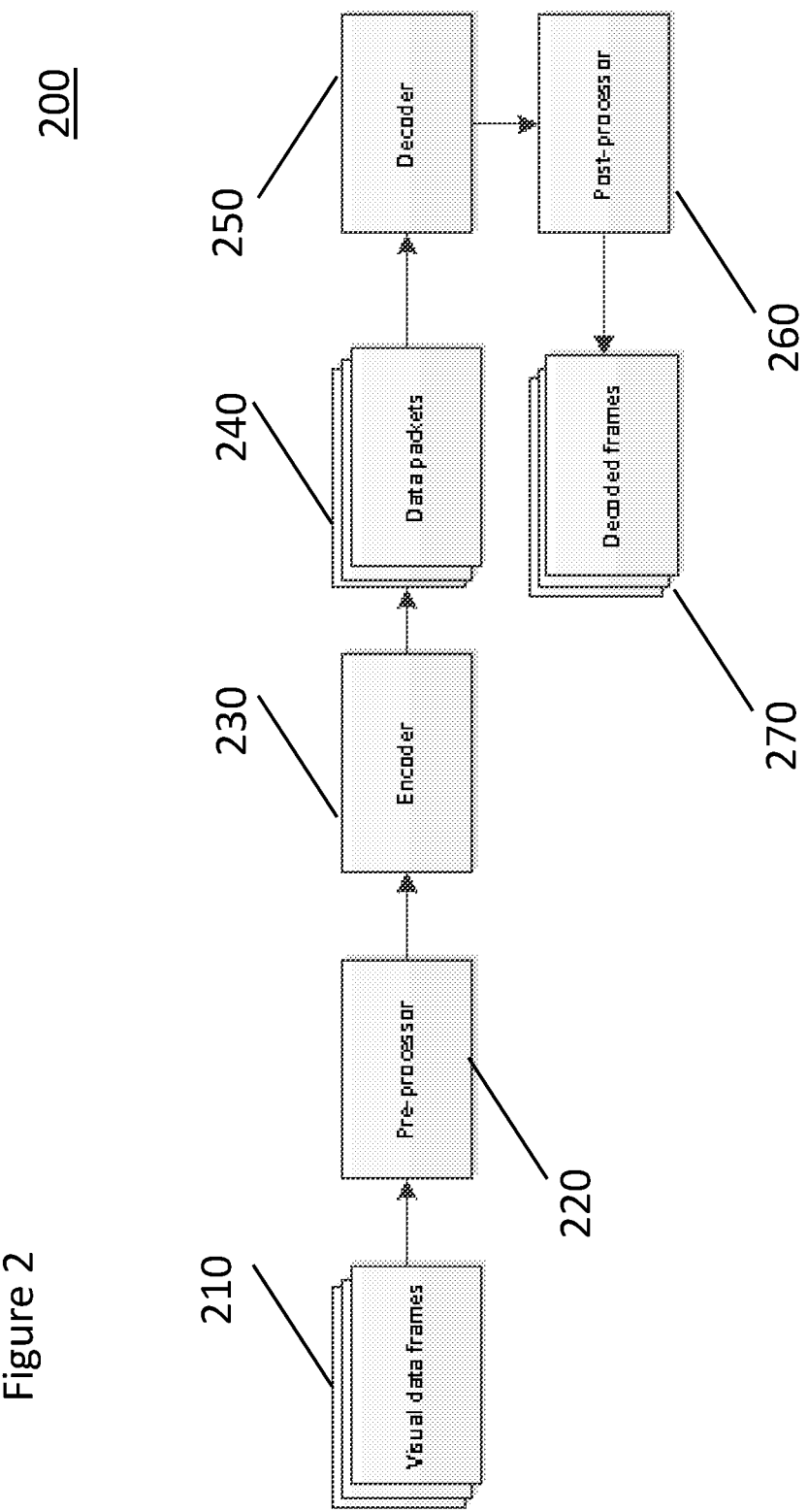
FIG. 2 illustrates the method steps of pre-processing visual data frames prior to encoding for transmission, and decoding received data then post-processing to obtain decoded visual data frames.

In one aspect, embodiments for a method and/or system for optimising an enhancement algorithm will now be described in detail with respect to FIG. 2 as follows. The described embodiment relates to a method but in other embodiments can relate to a system and/or apparatus.

In method 200, a pre-processor step 220 and a post-processor step 260 are provided. In the described embodiment, visual data is input as visual data frames 210, such as video data, or sections of visual data can be used in other embodiments.

The pre-processor step 220 receives the visual data frames 210 and processes the visual data frames 210 using a trained processing algorithm. The trained processing algorithm used at the pre-processor step 222, is used to lossy encode the visual data 210. In some embodiments, the trained processing algorithm may be represented by $f_\phi: \mathbb{X} \to \mathbb{R}^N$ where $\phi$ are the parameters of a smooth encoder f. The pre-processor step 220 then outputs the pre-processed visual data to a standard encoder step 230.

The standard encoder step 230, which involves the use of a standard visual data codec, is paired with the standard decoding step 250, which involves the use of the same standard visual data codec. The standard encoder step 230 involves the creation of data packets 240, h, containing optimised video data that has been compressed. In some embodiments, the standard visual data codec may be represented as a function, $h_\theta$, where $\theta$ are optional parameters.

The standard visual data codec may be used to losslessly or lossyly encode the output of the pre-processor, $f_\phi(x)$, such that the data packets 240 are represented by:

$$z = h_\theta(f_\phi(x)) \quad \text{Equation 1}$$

where z is the bit representation assigned by the codec

In at least one embodiment, the standard visual data codec uses the H.264 standard but, in other embodiments, any other suitable video or image compression standard would be a suitable for use in the paired encoder and decoder steps 230, 250. At step 250, the decoder of the standard visual data codec, $H_\theta$, processes the received data packets 240 such that:

$$\hat{z} = H_\theta(h_\theta(f_\phi(x))) \quad \text{Equation 2}$$

Suitable alternative video or image compression standards include codecs that can be generalised to a differential approximation for training the algorithms used in the pre-processor step 220 and the post-processor step 260.

In some embodiments, at step 260, the decoded data packets, $\hat{z}$, that is the output of the decoding step 250, are reconstructed using a post processor represented by a further function, $g_\psi$, which is used to produce reconstructed the visual data, $\hat{x}$. The success of any reconstruction is quantified using a metric $d(x, \hat{x})$. The post-processor step 260 receives the decoded data packets from step 250, and produces decoded frames 270.

Therefore, in some embodiments, the reconstruction error of a particular algorithm may be represented by:

$$\mathcal{L}(\psi) = \mathbb{E}[d(x, g_\psi(H_\theta(z)))] \quad \text{Equation 3}$$

where the expectation, $\mathbb{E}$, is taken with respect to the data x and the corresponding bit representation z.

In at least one embodiment, the pre-processor step 220 and/or post-processor step 260 is implemented using a trained hierarchical algorithm or neural network, such as a convolutional neural network, more details of which can be found in other embodiments in this specification and which can be applied in this aspect.

Training the hierarchical algorithms used in the pre-processor step 220 and/or post-processor step 260 is carried out as follows in at least one embodiment.

The pre-processor algorithms and the post-processor algorithms can be trained separately or together, but by training the pre-processor algorithms and the post-processor algorithms together a better output can be achieved in at least some embodiments. In some embodiments, the goal of training the pre-processor and post-processor algorithms is to obtain a small reconstruction error using as few bits as possible. That is, in some embodiments, the goal is to minimize:

$$\mathcal{L}(\theta,\phi,\psi) = \mathbb{E}[|h_\theta(f_\phi(x))|] + \lambda \mathbb{E}[d(x, g_\psi(H_\theta(h_\theta(f_\phi(x)))))] \quad \text{Equation 4}$$

where the expectation is taken with respect to the data distribution, $\lambda$ controls the trade-off between compression and reconstruction error and $|h(f(x))|$ is the number of bits in $h(f(x))$. In some embodiments, $H_\theta$ and/or $h_\theta$ cannot be differentiated, therefore a number of approximations may be made in order to minimise the number of bits, $\mathcal{L}(\theta,\phi,\psi)$, with respect to the parameters $\theta,\phi,\psi$ or a subset of them.

First a differential approximation for the effects of the standard encoder and decoder is determined for use, depending on the codec used by the encoder 230 and the decoder 250. This differential approximation is based on the selected codec used by the encoder-decoder pair in each embodiment, for example H.264. A first-order approximation algorithm, which in this embodiment is a gradient descent algorithm (but other suitable algorithms can be used in other embodiments), is applied in the training process to determine a full end-to-end system encapsulating how visual data being provided to the encoder 230 may be decoded by the decoder 250.

Furthermore, in some embodiment, where it is necessary to optimise the parameters of the standard visual data codec in steps 230 and 25, approximate gradients may be calculated as follows:

$$\nabla_\theta \mathcal{L} \approx \nabla_\theta \mathbb{E}[n_\theta(f_\phi(x))] \quad \text{Equation 5}$$

where $n_\theta$ represents a differential approximation of the number of bits used by the codec and may be used for optimizing the parameters of the codec.

$$\nabla_\phi \mathcal{L} \approx \nabla_\phi \mathbb{E}[n_\theta f_\phi(x)] + \lambda \nabla_\phi \mathbb{E}[d(x, g_\psi(q_\phi(f_\theta(x))))] \quad \text{Equation 6}$$

where $q_\theta$ represents a differential approximation of the effects of the codec.

$$\nabla_\psi \mathcal{L} = \lambda \nabla_\psi \mathbb{E}[d(x, g_\psi(H_\theta(h_\theta(f_\phi(x)))))] \quad \text{Equation 7}$$

In some embodiments, Equation 7 results in a minimization of an upper bound of the number of bits required.

Optionally, in some embodiments the generalised codec behaviour, such as the differential approximation of the codec, can be used as a middle (i.e. not the first or last) layer of a neural network (or hierarchical algorithm) and further optionally can be treated as a hidden layer that is fixed in functionality. The use of a differential approximation of the codec enables the use of techniques such as back-propagation so at to optimise the behaviour of the pre-encoder and post-decoder processes together in an end-to-end training framework. Such a layer effectively performs an encode process and then a decode process. Such a neural network/hierarchical algorithm can be trained where the input and output data is differentiable with respect to an object function, to allow for optimisation of the end-to-end process during training.

Optionally, in some embodiments, the neural network or hierarchical algorithm can be split or separated into three parts, where output layers have been enabled for each part, having (1) a pre-encoder layer; (2) the codec layer; and (3) the post-decoder layer.

Training can be performed on different source material as set out in other described aspects/embodiments, for example based on specific content or video samples/video.

In some embodiments, the training may enable certain pre-determined or hardware based criteria to be fixed so as to optimise the processing for specific hardware. For example, training may enable the ability to achieve the best optimisation for a particular bandwidth. Similarly, in some embodiments, quality criteria could be fixed so as to achieve the best possible optimisation which results in a particular quality.

Optimisation by the pre-processor step 220 allows for the input to the standard encoder 230 to be optimised, based on the trained pair of pre-processor and post-processor neural network/hierarchical algorithm for input into the post-processor step 260 by the standard decoder 250.

In some embodiments, the trained models may be used as part of a standard single image (or intra-image) codec, such as JPEG, or in other embodiments may be used as part of an intra-frame encoder in a video codec.

Any system feature as described herein may also be provided as a method feature, and vice versa.

As used herein, means plus function features may be expressed alternatively in terms of their corresponding structure.

In particular, method aspects may be applied to system aspects, and vice versa.

Furthermore, any, some and/or all features in one aspect can be applied to any, some and/or all features in any other aspect, in any appropriate combination.

It should also be appreciated that particular combinations of the various features described and defined in any aspects of the can be implemented and/or supplied and/or used independently.

In alternative embodiments, the input visual data concerned may be media for playback, such as recorded visual data or live streamed visual data, or it can be videoconference video or any other visual data source such as video recorded or being recorded on a portable device such as a mobile phone or a video recording device such as a video camera or surveillance camera.

It should also be appreciated that the term visual data, may refer to a single image, a sequence of images, video, or a section of visual data.

It should further be appreciated that the term enhancing may refer to upscaling, increasing the resolution and/or quality of visual data. References to enhancing or increasing the quality of visual data can refer to upscaling or using enhancement techniques of the possible embodiments described. References to down sampling can refer to reducing the resolution and/or quality of visual data (for example by quantisation to lower the bit rate of the visual data).

It should also be appreciated that the term frame, particularly in reference to grouping multiple frames into scenes, can refer to both an entire frame of a video and an area comprising a smaller section of a frame.

In aspects and/or embodiments, the terms algorithms and/or models and/or parameters can be used interchangeably or exchanged with each other. Further, in aspects and/or embodiments, the terms hierarchical algorithm, hierarchical model and hierarchical parameter can be exchanged with the terms convolutional neural networks and/or convolutional neural network model, convolutional neural network algorithm, convolutional neural network parameter.

What is claimed is:

1. A method for jointly training a pre-processing neural network and a post-processing neural network for a visual data encoding and decoding process, the method comprising:
    determining a differential approximation of the encoding and decoding process;
    receiving one or more sections of input visual data;
    using a pre-processing neural network to process the input visual data and to output pre-processed visual data;
    applying the encoding and decoding process to the pre-processed visual data to generate decoded visual data;
    using a post-processing neural network to further process the decoded visual data and to output reconstructed visual data;
    comparing the reconstructed visual data with the input visual data using a metric; and
    updating parameters of the pre-processing neural network and the post-processing neural network using the differential approximation of the encoding and decoding process and based on the comparing of the reconstructed visual data with the input visual data.

2. The method according to claim 1, wherein updating the parameters of the pre-processing neural network and the post-processing neural network includes optimising the pre-processing neural network and the post-processing neural network with respect to the metric.

3. The method according to claim 1, wherein one or more parameters associated with the pre-processing neural network is stored in a library for re-use in encoding alternative visual data similar to the visual data used for training.

4. The method according to claim 1, further comprising:
    transmitting the one or more updated parameters associated with the pre-processing neural network to a device configured to use the pre-processing neural network with the updated parameters in encoding visual data similar to the input visual data.

5. The method according to claim 1, further comprising:
    transmitting the one or more updated parameters with the post-processing neural network with processed visual data to a remote device configured to use the post-processing neural network with the updated parameters, wherein the remote device has another pre-processing neural network associated with the post-processing neural network.

6. The method according to claim 1, wherein at least one of:
    the pre-processing neural network includes a layer that generalises the visual data processing, and
    the post-processing neural network includes a layer that generalises the visual data processing.

7. The method according to claim 1, wherein receiving a plurality of predetermined bit rate for use in training the pre-processing neural network or in training the post-processing neural network.

8. The method according to claim 1, wherein input visual data includes at least one of:
    a single frame of visual data,
    a sequence of frames of visual data, and
    a region within a frame or sequence of frames of visual data.

9. The method according to claim 1, wherein the pre-processing neural network is different for each section of the visual data.

10. The method according to claim 1, wherein the post-processing neural network is developed using a machine learning approach.

11. The method according to claim 1, wherein the post-processing neural network is a non-linear neural network including at least one convolutional neural networks.

12. The method according to claim 1, wherein one of:
    the pre-processing neural network is used as a first filter when encoding the visual data, and
    the post-processing neural network is used as a second filter when decoding the visual data.

13. The method according to claim 1, wherein the pre-processing neural network uses a spatio-temporal approach.

14. The method according to claim 1, wherein using the pre-processing or post-processing neural network includes at least one of:
    training the neural network,
    generating the neural network, and
    developing the neural network.

15. The method according to claim 2, wherein the pre-processing neural network and the post-processing neural network are optimized based on a tradeoff between compression and reconstruction error.

16. The method according to claim 1, wherein the differential approximation of the encoding and decoding process includes neural network layer.

17. The method according to claim 1, wherein the updating the parameters of the pre-processing neural network and the post-processing neural network include applying a back-propagation algorithm using gradients of the differential approximation to the encoding and decoding process.

* * * * *